United States Patent
Thomson et al.

(10) Patent No.: US 6,297,763 B1
(45) Date of Patent: Oct. 2, 2001

(54) METHOD OF OPTIMIZING THE COVERAGE AREA OF A SENSOR

(75) Inventors: Ola Thomson, Askim; Benny Bentland, Lindome, both of (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/218,169

(22) Filed: Dec. 22, 1998

(30) Foreign Application Priority Data

Dec. 23, 1997 (SE) .................................................. 9704861

(51) Int. Cl.[7] .................................................. G01S 13/00
(52) U.S. Cl. ................... 342/75; 342/73; 342/74; 342/80; 342/149; 342/175; 342/195; 342/368
(58) Field of Search ................... 342/23, 24, 25, 342/27–41, 73–81, 165, 175, 176, 184, 195, 26, 161, 205, 147–158, 368–377

(56) References Cited

U.S. PATENT DOCUMENTS

| | | |
|---|---|---|
| H126 | 9/1986 | Allen et al. . |
| 3,670,334 * | 6/1972 | Gaheen, Jr. ............................ 342/76 |
| 3,793,634 * | 2/1974 | Heller et al. ........................... 342/80 |
| 3,903,525 * | 9/1975 | Mullins et al. ....................... 342/161 |
| 3,924,235 * | 12/1975 | Heller et al. ........................... 342/75 |
| 4,129,866 | 12/1978 | Turco . |
| 4,779,097 | 10/1988 | Morchin . |
| 5,045,855 * | 9/1991 | Moreira ................................. 342/25 |
| 5,097,267 | 3/1992 | Raviv . |
| 5,166,688 * | 11/1992 | Moriera ................................. 342/25 |
| 5,311,184 * | 5/1994 | Kuntman ............................... 342/26 |
| 5,357,259 | 10/1994 | Nosal . |

* cited by examiner

Primary Examiner—Bernarr E. Gregory
(74) Attorney, Agent, or Firm—Burns, Doane, Swecker & Mathis, L.L.P.

(57) ABSTRACT

A method is provided of optimizing, within an area which itself contains a number of part areas, the coverage of a sensor which has an angle-dependent range in a least one plane, and which sensor is in addition arranged on a mobile platform. The method includes determining at least two movement directions for the sensor platform, determining a center of movement for the two movement directions, and also determining periods of time during which the sensor platform is to move in each of the two movement directions. The center of movement of the platform is preferably located within the search area.

14 Claims, 5 Drawing Sheets

METHOD OF OPTIMIZING THE COVERAGE AREA OF A SENSOR

TECHNICAL FIELD

The present invention relates to a method of optimizing the coverage area of a sensor, preferably a radar system, which is arranged on a mobile platform.

BACKGROUND

In the use of sensors, for example radar, it may be desirable to use a sensor to cover a greater area than the range of the sensor allows. A common way of achieving such increased coverage is to arrange the sensor on a mobile platform, the platform then being moved in such a manner that the desired area is covered. Aircraft, ships and cars may be cited as examples of platforms for sensors.

In the case of the above mentioned type of movement with a sensor platform, a problem arises regarding how the platform is to be moved in order to achieve the desired coverage. This problem may arise in particular if the range of the sensor is not symmetrical. If the sensor is a radar system, this problem may arise above all in connection with so-called group antennas, in other words antennas with an antenna pattern or pointing direction that is controlled electrically, since such antennas often have a range which is angle-dependent at least in one plane. The range of the sensor may, however, be symmetrical in the plane in which the range is angle-dependent.

U.S. Pat. No. 4,129,866 discloses a method of solving a similar problem for a radar system with its antenna arranged on top of an aircraft. In the solution that is described, the carrier aircraft is flown along a sinusoidal path in relation to the ground plane. This may be said to create disadvantages since the pointing direction of the antenna in the vertical direction will vary in an undesirable manner in connection with the turns of the aircraft.

Other known solutions are described in, inter alia, U.S. Pat. No. 5,097,267, U.S. Pat. No. 4,779,097 and U.S. Pat. No. 5,357,259. These specifications disclose methods of solving coverage problems in connection with group antennas mounted on aircraft. All the solutions described in these specifications comprise mechanical steering of the antennas in relation to the platform, which may be said to lead to complex and thus expensive solutions.

SUMMARY

The problem that is solved according to the invention is thus that of optimizing within a given area the coverage achieved by a sensor, preferably a radar, which area may itself contain a number of smaller part areas. In particular, the invention aims to solve the problem that arises if the area in question is greater than the coverage area of the sensor, and the sensor has a symmetrical but angle-dependent range in at least one plane and is arranged on a mobile platform, the main movement of which takes place in the plane in which the range of the sensor is symmetrical.

This problem is solved with the aid of an optimization method which comprises determining at least two movement directions for the sensor platform, determining a centre of movement for these two movement directions, and also determining the periods of time for which the sensor platform is to move in each of said two movement directions.

In a preferred embodiment, the optimization comprises minimizing the sum of the differences between the desired and the achieved range in azimuth (angle).

A fact that is made use of in the application of the invention is that the movement of the sensor platform in the great majority of cases is considerably smaller than the range of the sensor, which means that the sensor platform can, notwithstanding its movement, essentially be considered to be stationary.

In a preferred embodiment, the two movement directions form a closed contour, in which case their centre of movement constitutes the centre point of the contour. In another embodiment, in which the two movement directions do not form a closed contour but rather a continuous but not closed shape, the centre of movement forms a center line in this continuous shape.

In both the above cases, the centre of movement of the platform is preferably located within the search area.

BRIEF DESCRIPTION OF THE DRAWINGS

The invention will be described in greater detail below with the aid of an exemplary embodiment and with reference to the appended drawings, in which.

DETAILED DESCRIPTION

Figure 1:
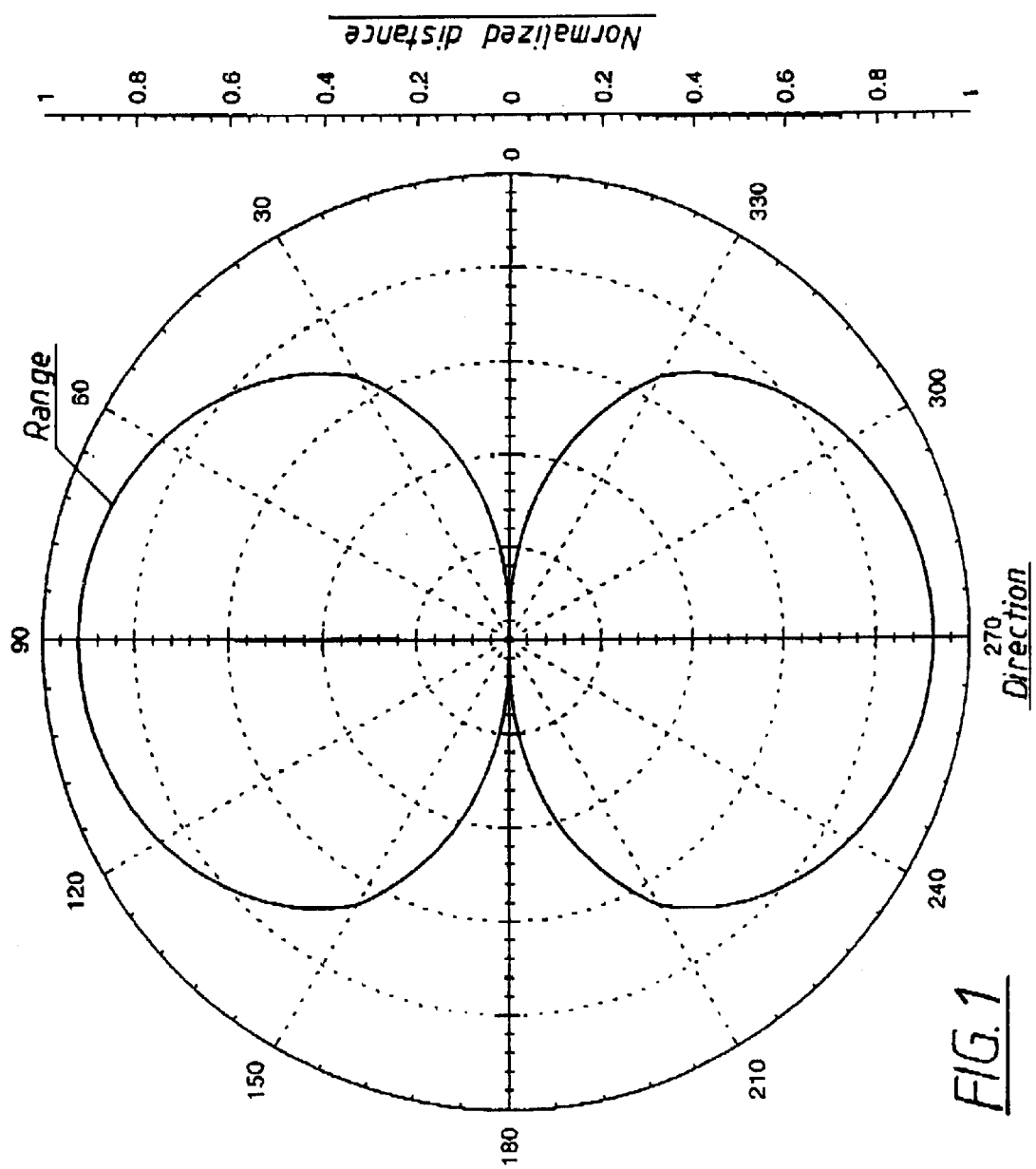
FIG. 1 shows a range diagram for a given detection probability for a radar system to which the invention can be applied.

FIG. 1 shows a range pattern for a given detection probability of a radar system to which the invention can be applied. The invention will be described throughout below as being applied to a radar system mounted on an aircraft but it is to be understood that the invention may in principle be applied to a great many different sensors, both active and passive, and also that the platform on which the sensor is arranged may vary.

IR sensors may be cited as an example of passive sensors, and ships and cars may be cited as examples of other types of sensor platforms. The term flight direction that is used below is to be understood as the movement direction of an arbitrary sensor platform.

As can be seen from FIG. 1, the radar system has a range which is symmetrical and azimuth-dependent in at least the plane that is shown in FIG. 1. A problem to solve is then that of optimizing the coverage of the radar system in azimuth in a given search area, which search area is usually greater than the greatest coverage area of the radar system. Optimization in this respect means adapting the coverage of the radar system to a given search area. A definition follows below of what is meant by the term coverage in this description.

Figure 2:
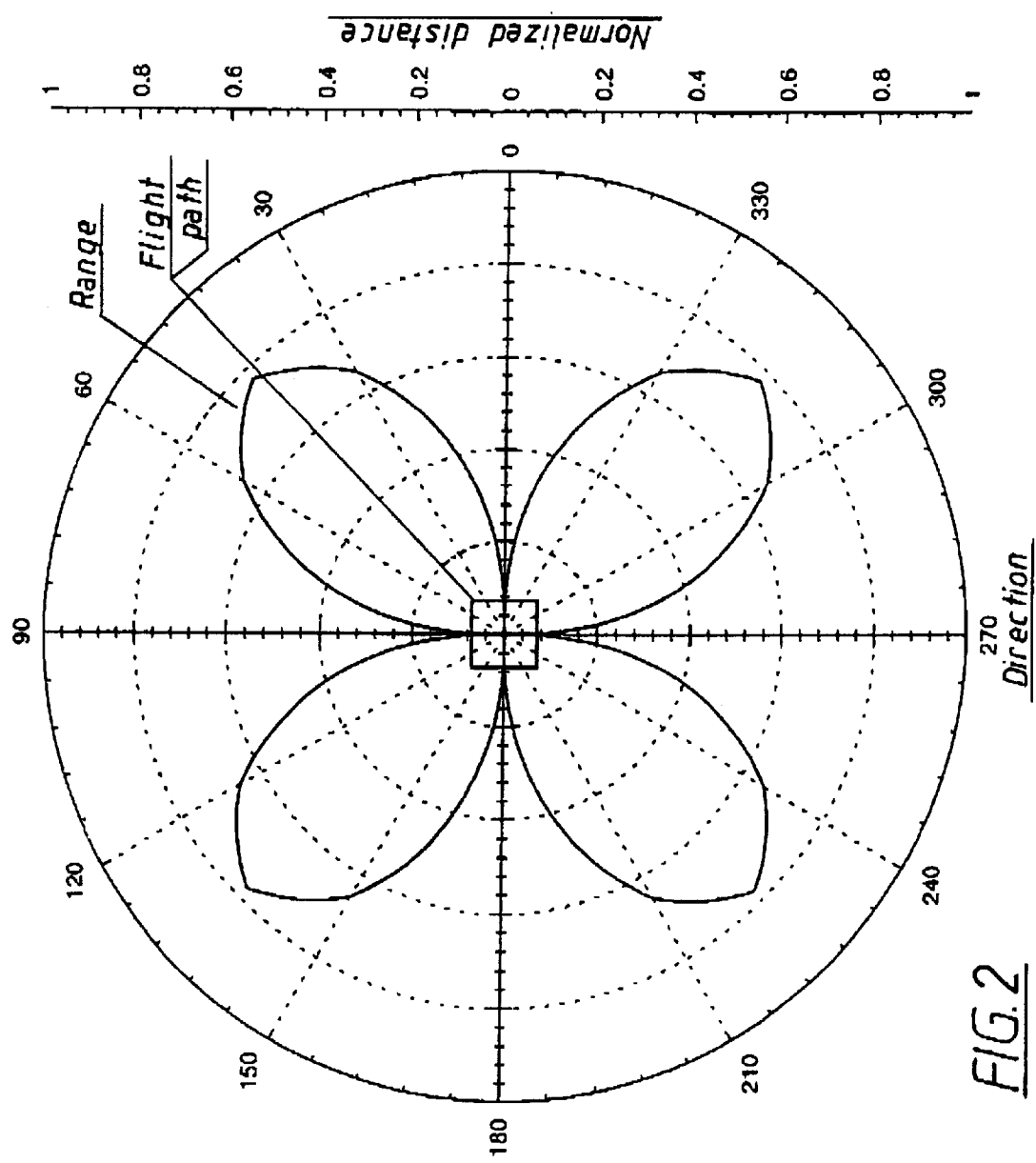
FIG. 2 shows a range diagram for the radar system in FIG. 1, when the radar system is mounted on a platform which moves along a square path.
Figure 3:
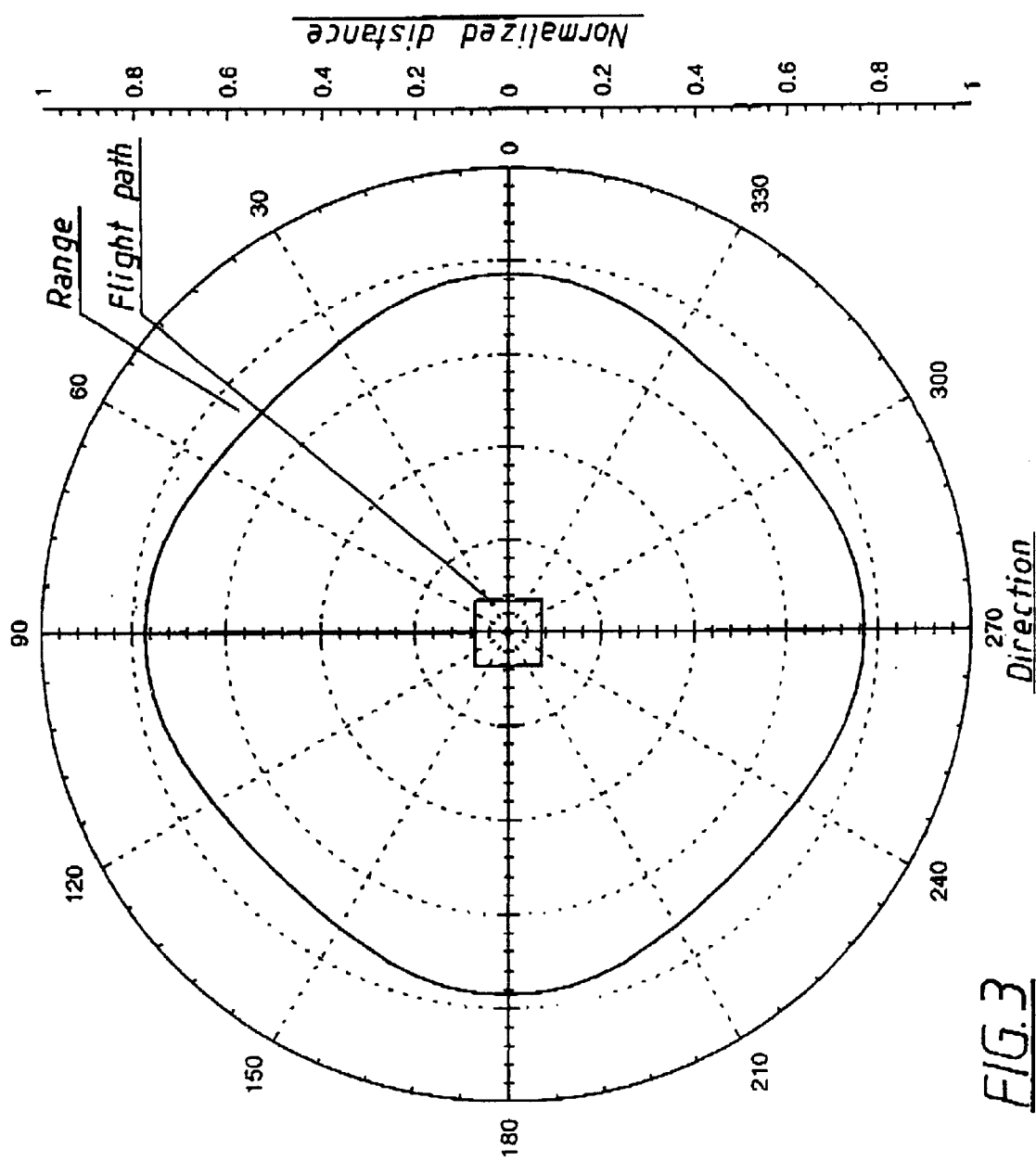
FIG. 3 shows the detection range of the radar system in FIG. 1, when the radar system is mounted on a platform which moves along a square path.

Coverage can be divided into two concepts, tracking continuity and detection range:

tracking continuity is defined as the area within which a given detection probability per radar sweep is achieved continuously in the case of essentially rectilinear movement of the sensor platform. Tracking continuity in the case of flying in more than one direction is obtained by calculating the overlap between the ranges for the different flight directions. FIG. 2 shows the tracking continuity of the same radar system as in FIG. 1 in the case of flying along a square flight path which is shown greatly enlarged in the figure. The tracking continuity then becomes the overlap between two patterns of the same type as that in FIG. 1, which two patterns are at right angles to one another.

detection range is defined in this description as the range for which the cumulative detection probability amounts to a given value for radially incoming targets with a given radar target area and a given velocity. The cumulative detection probability for a given target may be expressed as $1-[(1-Pd(1))(1-Pd(2)) \ldots (1-Pd(N))]$, where $Pd(n)$ is the detection probability for a given target in the case of radar sweep number n. FIG. 3 shows the detection range for the same radar system as in FIG. 1 in the case of flying along a square flight path which is shown greatly enlarged in the drawing.

Given the prerequisites that apply in the present case, it can be shown that at most two flight directions are sufficient in order to solve the optimization problem described above. more than two flight directions cannot improve the optimization.

As far as the tracking continuity is concerned, this is due to the fact that the tracking continuity has above been defined as the overlap between the coverages of the different flight directions, and it will be realized that more than two flight directions can only lead to reduced overlap. with regard to the detection range, it can be shown that the two cases 0° and 90° respectively between the flight directions give the best coverage, in other words that 0° gives the best range at a given angle, and that 90° gives the best range considered over all angles.

In practice, if it is desired to achieve a closed flight path, it may be necessary to introduce two further flight directions, rotated 180° from the first two. In other words, these two further flight directions are "counter-courses" with regard to the first two flight directions. On account of the symmetry of the radar system (see FIG. 1), this does not affect the solution of the optimization problem.

As it has thus been possible to establish that two flight directions are sufficient in order to optimize the coverage of the radar, it remains to define the following parameters in order to obtain optimum coverage:

the two flight directions,
the centre of movement for the two flight directions,
the periods of time for movement in each of the two flight directions.

Figure 4:
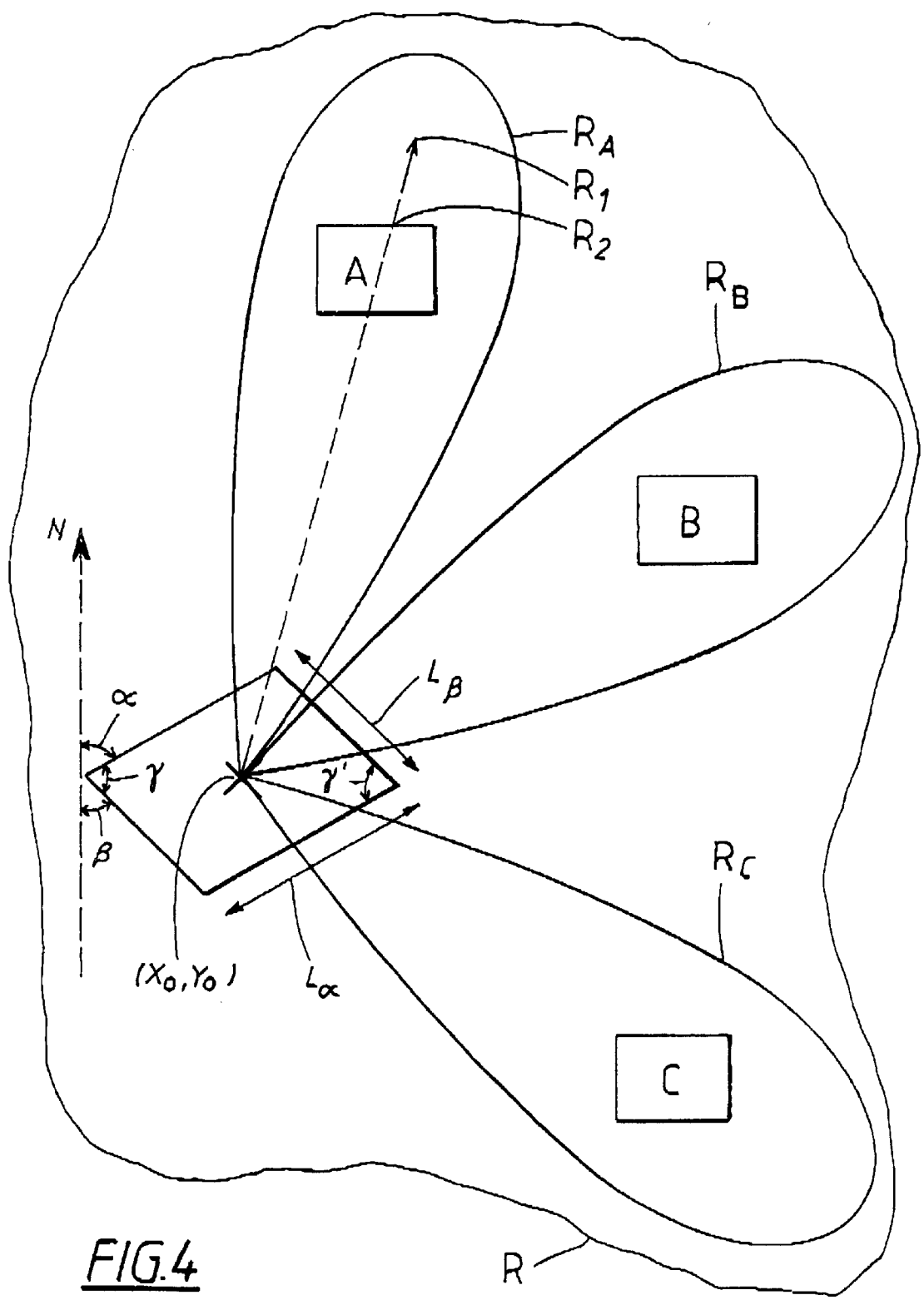
FIG. 4 shows diagrammatically a possible application of a method according to the invention, seen from above.

FIG. 4 shows a general diagram of an application of the invention, seen from above. Within an area R, there are a number of part areas A, B and C which are the areas that it is actually desired to cover with the radar. As the radar in this exemplary embodiment is one with an electrically steerable antenna, the antenna has been steered, as shown in the figure, to cover only the part areas A, B and C, which is indicated in FIG. 4 by the areas of coverage $R_A$, $R_B$ and $R_c$.

The aircraft in FIG. 4 moves with a rhombic movement, which movement has its centre at coordinates $(x_o, y_o)$. The rhombus shape in which the aircraft moves consists of four "legs" which actually consist of two flight directions and their respective counter-courses.

The two flight directions have angles $\alpha$ and $\beta$ respectively in relation to a common reference direction, in the figure the north direction N. The angles $\gamma$ and $\gamma'$ between the two flight directions can of course also be determined, after which the orientation of the whole flight contour in relation to a common reference direction is defined.

Each flight direction is followed for a given time, or for a distance that corresponds to movement for a given time. These distances have been designated as $L_\alpha$ and $L_\beta$ respectively in FIG. 4.

The optimization criterion that is used according to the invention comprises minimizing (in azimuth) the difference between the desired and the achieved range, which in practice means that a sum of such differences is calculated for a suitable number of angles in the range(s) it is desired to cover. The flight path that gives the smallest such sum is selected as the flight path for the sensor platform. This will be expanded upon below.

In other words, the optimization criterion that is used according to the invention comprises minimizing (in azimuth) the difference between the desired and the achieved range. Desired range $R_2$ and achieved range $R_1$ are shown in FIG. 4 in a given direction. What is calculated according to the optimization criterion is thus the difference $R_2-R_1$. In order that FIG. 4 does not become unclear, only one difference $R_2-R_1$ is shown, but it is of course possible, as indicated above, to calculate a number of differences for consecutive angles for each part area A, B and C, or rather for the areas $R_A$, $R_B$ and $R_C$ that the radar is scanning.

Optimization is then performed by minimizing the sum of these differences for the sector(s) that it is desired to cover. Minimization thus means that either as much of the part areas A, B, C as possible is covered if full coverage cannot be achieved, or the part areas A, B, C are covered using the lowest possible transmitted power from the radar system. In other words, the output power and the sum of the above mentioned differences may be regarded as parameters that are to be minimized.

If there are different requirements with regard to which function, detection range or tracking continuity, is to be prioritized within the various part areas A, B, C, each part area A, B, C can be given two weighting factors, one for each function. These weighting factors are then used in the optimization. The weighting factors can also be varied adaptively during flying.

Which mathematical method that is used to perform the optimization according to the invention is not of crucial importance. However, a possible algorithm is described below, in order to facilitate understanding of the invention.

1. Find an initial solution. This may be done, for example, by making the position of the centre point $(x_o, y_o)$ the centre point between the two part-area corner points that have the greatest mutual distance, and also by setting the two flight directions $(\alpha, \beta)$ at right angles to one another, one flight direction being made to coincide with a-line through said two corner points.

2. Vary the two flight directions, their centre of movement and also the periods of time for movement in the respective direction in a structured manner so that a gradually improving solution, in other words a smaller and smaller difference, is obtained.

3. Break off searching when the difference has reached a limit considered to be acceptable. This limit may be determined in advance, or may be varied adaptively/interactively with the operator when calculation is carried out.

Figure 5:
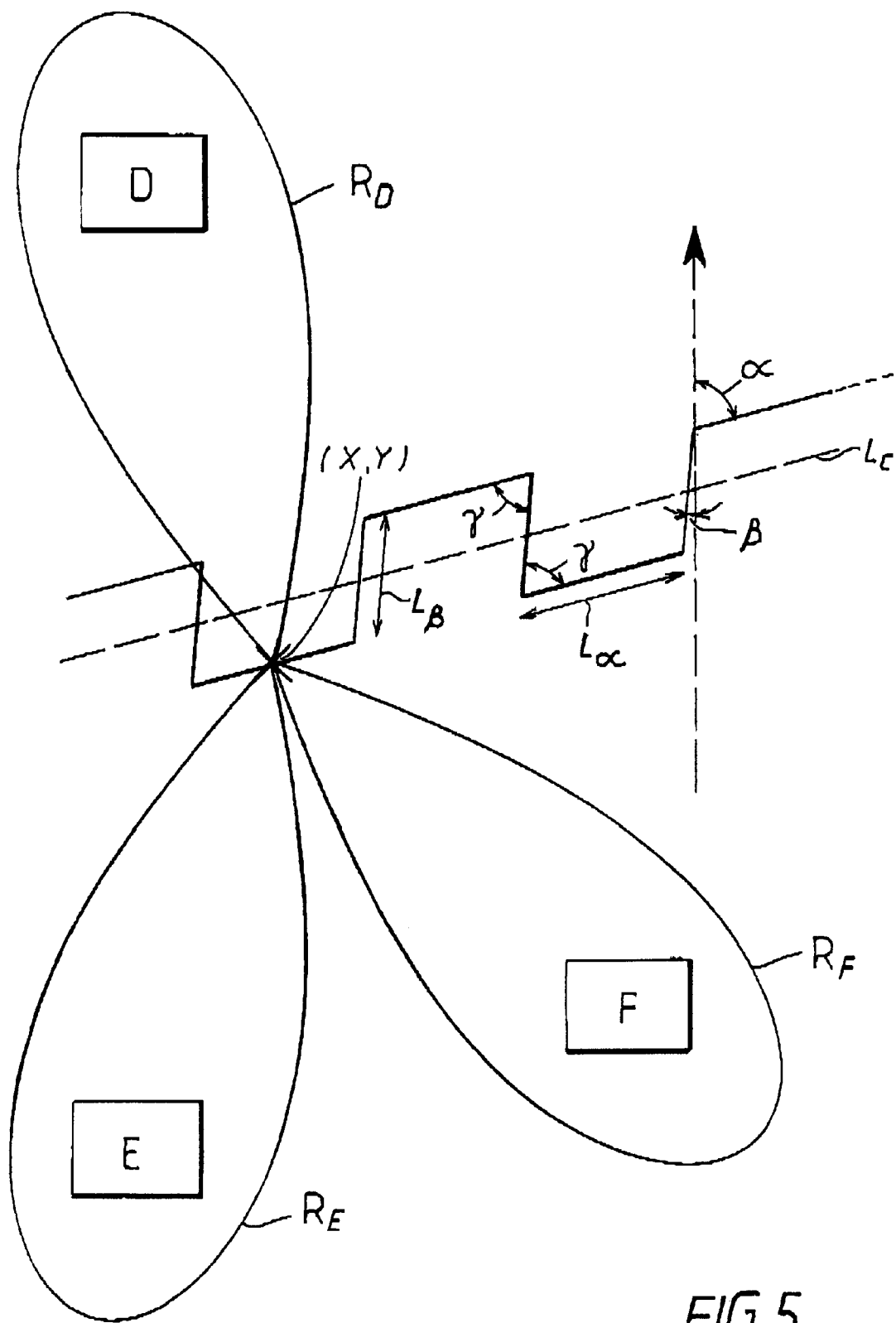
FIG. 5 shows diagrammatically another possible application of a method according to the invention, seen from above.

FIG. 5 shows a general diagram of an alternative application of the invention, seen from above. In an area R', there are a number of part areas D, E and F. The difference between the applications in FIG. 5 and FIG. 4 is that the flight path in FIG. 5 does not constitute a closed contour but instead forms an open continuous contour. The centre of movement for this contour is not then a discrete point ($x_o$, $y_o$) as in FIG. 4; the centre of movement is instead a centre line $L_c$ in the contour. In other respects, the same method as has been described above is used. The course angles have been given the same designations in FIG. 5 as in FIG. 4. In FIG. 5, the position of the aircraft along the path is shown at the point (x, y), and the antenna of the radar has been steered so as to cover the part areas D, E and F, which is indicated in FIG. 5 by the areas of coverage $R_D R_R$ and $R_F$.

The invention is not limited to the exemplary embodiments that have been described above but may be varied freely within the scope of the appended patent claims. For example, it is not necessary for the centre of movement of the platform to be located within the search area. Furthermore, instead of performing the optimization by minimizing the differences between the desired and the achieved range $R_2-R_1$, it is possible to aim to maximize the difference $R_1-R_2$. It is not entirely necessary either for the sensor to which the invention is applied to have a symmetrical range; the invention may also be applied to other types of sensor with a range that is angle-dependent but not symmetrical.

What is claimed is:

1. Method of optimizing a coverage area of a sensor, within an area that contains a number of part areas, the sensor having an angle-dependent range in at least one plane and being arranged on a mobile sensor platform, the method comprising the following steps:

determining at least two movement directions for the sensor platform such that the angle between the sensor and the at least one plane is substantially constant as the sensor platform travels along each of the at least two movement directions;

determining a center of movement for said two movement directions;

determining periods of time for moving the sensor platform in each of said two movement directions, wherein the movement directions, the center of movement and the periods of time are determined so that the sum of the differences between the desired range and the achieved range in azimuth of the sensor is minimized; and adapting the coverage area of the sensor to a given search area.

2. Method according to claim 1, wherein the center of movement is located within the said area.

3. Method according to claim 1, wherein said two movement directions form a closed contour, said center of movement forming the center point of the contour.

4. Method according to claim 3, wherein the part areas forming part of said area are assigned weighting factors for use in the minimization.

5. Method according to claim 4, wherein the sensor is a passive sensor.

6. Method according to claim 1, wherein the sensor is an active sensor.

7. Method according to claim 6, wherein the active sensor is a radar system.

8. Method according to claim 1, wherein it is applied to a sensor with a range which is symmetrical at least in the plane in which the range of the sensor is angle-dependent, and which sensor is arranged on a mobile sensor platform, the main movement of which takes place in the plane in which the range of the sensor is symmetrical.

9. Method according to claim 1, wherein it is used in a sensor platform formed by an aircraft.

10. Method according to claim 1, wherein it is used in a sensor platform formed by a ship.

11. Method according to claim 1, wherein it is used in a sensor platform formed by a land vehicle.

12. Method according to claim 1, wherein each of the at least two movement directions is substantially linear.

13. Method of optimizing a coverage area of a sensor, within an area that contains a number of part areas, the sensor having an angle-dependent range in at least one plane and being arranged on a mobile sensor platform, the method comprising the following steps:

assigning weighting factors to at least some of the number of part areas;

determining at least two movement directions for the sensor platform wherein the at least two movement directions form a closed contour;

determining a center of movement for said two movement directions wherein the center of movement forms the center point of the contour;

determining periods of time for moving the sensor platform in each of said two movement directions, wherein the movement directions, the center of movement and the periods of time are determined so that the sum of the differences between the desired range and the achieved range in azimuth of the sensor is minimized and wherein the desired range is determined using the weighting factors assigned to at least some of the number of part areas; and adapting the coverage area of the sensor to a given search area.

14. Method of optimizing a coverage area of a passive sensor, within an area that contains a number of part areas, the passive sensor having an angle-dependent range in at least one plane and being arranged on a mobile sensor platform, the method comprising the following steps:

determining at least two movement directions for the sensor platform wherein the at least two movement directions form a closed contour;

determining a center of movement for said two movement directions wherein the center of movement forms the center point of the contour;

determining periods of time for moving the sensor platform in each of said two movement directions, wherein the movement directions, the center of movement and the periods of time are determined so that the sum of the differences between the desired range and the achieved range in azimuth of the passive sensor is minimized; and adapting the coverage area of the passive sensor to a given search area.

* * * * *